(12) United States Patent
Davieau et al.

(10) Patent No.: US 12,027,071 B2
(45) Date of Patent: Jul. 2, 2024

(54) BRAKING SIMULATION DEVICE FOR A SIMULATOR AND ASSOCIATED METHOD

(71) Applicant: THALES, Courbevoie (FR)

(72) Inventors: Matthieu Davieau, Courbevoie (FR); René Le Guillou, Maurepas (FR)

(73) Assignee: THALES, Courbevoie (FR)

( * ) Notice: Subject to any disclaimer, the term of this patent is extended or adjusted under 35 U.S.C. 154(b) by 252 days.

(21) Appl. No.: 16/649,648

(22) PCT Filed: Oct. 2, 2018

(86) PCT No.: PCT/EP2018/076716
§ 371 (c)(1),
(2) Date: Mar. 21, 2020

(87) PCT Pub. No.: WO2019/068670
PCT Pub. Date: Apr. 11, 2019

(65) Prior Publication Data
US 2020/0258415 A1      Aug. 13, 2020

(30) Foreign Application Priority Data

Oct. 5, 2017   (FR) ...................................... 1701032

(51) Int. Cl.
*G09B 9/12*       (2006.01)
(52) U.S. Cl.
CPC ...................................... *G09B 9/12* (2013.01)
(58) Field of Classification Search
CPC ....................................................... G09B 9/12
See application file for complete search history.

(56) References Cited

U.S. PATENT DOCUMENTS

| 6,283,757 B1* | 9/2001 | Meghnot .................. G09B 9/46 |
| | | 434/33 |
| 2013/0126666 A1* | 5/2013 | Brown .................... B64C 39/04 |
| | | 244/2 |

(Continued)

FOREIGN PATENT DOCUMENTS

| EP | 0 771 705 A1 | 5/1997 |
| EP | 1 138 564 A2 | 10/2001 |

(Continued)

OTHER PUBLICATIONS

Smith, R. "A description of the cockpit motion facility and the research flight deck simulator." Modeling and Simulation Technologies Conference. 2000.*

(Continued)

*Primary Examiner* — Rehana Perveen
*Assistant Examiner* — Nithya J. Moll
(74) *Attorney, Agent, or Firm* — BakerHostetler (57) ABSTRACT

A foot-braking simulation device for a simulator includes a mechanical braking module configured for supplying a linear effort value in response to a press on a brake pedal; an electromagnetic friction module configured for supplying a friction force value in response to the press on brake pedal; and a software calculation module configured for combining the values obtained from the mechanical braking and electromagnetic friction modules to calculate a control value, and generate variable force feedback on the brake pedal as a function of the control value.

13 Claims, 5 Drawing Sheets

(56) References Cited

U.S. PATENT DOCUMENTS

| | | | | |
|---|---|---|---|---|
| 2015/0344005 A1* | 12/2015 | Shand | ............... | G05G 5/03 74/514 |
| 2016/0140861 A1* | 5/2016 | Tischer | ............... | G09B 9/06 434/69 |
| 2016/0379512 A1* | 12/2016 | Kirkman | ............... | G09B 9/06 434/34 |

FOREIGN PATENT DOCUMENTS

| | | |
|---|---|---|
| EP | 2 020 652 A2 | 2/2009 |
| EP | 2 818 371 A1 | 12/2014 |
| FR | 2 884 183 A1 | 10/2006 |

OTHER PUBLICATIONS

Farshizadeh, Emad, et al. "A concept for an electrohydraulic brake system with adaptive brake pedal feedback." Proceedings of the Institution of Mechanical Engineers, Part D: Journal of Automobile Engineering 229.6 (2015): 708-718.*

Kang, D. K., and M. S. Kim. "Hardware-in-the-loop simulation to evaluate the drive performance of the electric two-wheelers on a motor dynamometer." International Journal of Automotive Technology 16.6 (2015): 1031-1040.*

Ho, Hon Ping. The Influence of Braking System Component Design Parameters on Pedal Force and Displacement Characteristics. Simulation of a passenger car brake system, focusing on the prediction of brake pedal force and displacement based on the system components and their design characteristics. Diss. University o.*

Hodge, Steven J., et al. "Time-Accurate Ship Airwake and Unsteady Aerodynamic Loads Modeling for Maritime Helicopter Simulation." Journal of the American helicopter society 54.2 (2009): 22005-22005.*

Holzapfel, Florian, Ingo Sturhan, and Gottfried Sachs. "Low-cost PC based flight simulator for education and research." AIAA Modeling and Simulation Technologies Conference and Exhibit. 2002.*

Ho, Hon Ping. The Influence of Braking System Component Design Parameters on Pedal Force and Displacement Characteristics. Simulation of a passenger car brake system, focusing on the prediction of brake pedal force and displacement based on the system components and their design characteristics. (Year: 2015).*

* cited by examiner

BRAKING SIMULATION DEVICE FOR A SIMULATOR AND ASSOCIATED METHOD

CROSS-REFERENCE TO RELATED APPLICATIONS

This application is a National Stage of International patent application PCT/EP2018/076716, filed on Oct. 2, 2018, which claims priority to foreign French patent application No. FR 1701032, filed on Oct. 5, 2017, the disclosures of which are incorporated by reference in their entirety.

FIELD OF THE INVENTION

Technical Field

The invention relates to the field of simulators, in particular to that of aeronautical simulators, and proposes a device suitable for simulating the foot-braking system on rudder bar pedals.

BACKGROUND

The main simulator certification standards are governed by different organizations such as the European Aviation Safety Agency (EASA), the United States civil aviation administration, or "Federal Aviation Administration" (FAA), or the International Civil Aviation Organization (ICAO). To obtain a certification for the simulators called "full flight simulator" (FFS) strong requirements are imposed in terms of representativeness of the cockpit. Thus, when they are described in the procedures of the flight manual, the behavior and the appearance of the controls of the simulator must be strictly faithful to the real carrier.

These certification standards, but also the pilots using the simulators, demand maximum realism, and this criterion is a technical differentiating factor on the market. In this context, the behavior associated with the use of the different controls must be simulated in the most faithful manner possible. In particular, the simulation of a pedal braking system must, among other things, take account of the pressurization of the hydraulic circuit according to the actions of the pilots. Indeed, for certain types of carriers, during runway taxiing operations, the pressure of the braking hydraulic circuit can change dynamically, resulting in an increase or a reduction of the effort felt by the pilots on the brake pedals. So, it is necessary to dynamically adapt the range of travel of the pedal and the force feedback felt under the feet of the pilots during a piloting or taxiing training session.

The current braking simulation solutions for the carriers concerned with foot braking, are solutions based on hydraulic components or electrical solutions that are partially faithful, replicating only a stable operation of the brakes without replicating the pressure variation of the hydraulic circuit.

Some airplane simulators are equipped with so-called "brushless" motors driven by variable speed drives to simulate the behavior of the brakes, but this solution is ponderous in terms of implementation, because it requires a significant bulk for it to be installed in the technical hold situated under the floor of the simulated cockpit. Furthermore, the motor/variable speed drive torques are costly solutions.

Finally, in the field of simulation, users demand less energy-intensive equipment, increasingly more mindful of the environment and the maintenance of which does not require specific skills. This trend means having to design simulators without hydraulic energy, this energy requiring qualified and authorized maintenance operatives, and then generating regulatory constraints.

The difficulty resides in finding a solution with comparable performance levels using mainly mechanical or electrical components, without disturbing the dynamics of the rudder bar, by strictly observing the kinematics of the pedals of the real carrier, without reducing or impacting the field of view of the pilots, with a competitive cost and which can be implemented in a highly restricted space around the pedals.

It is then necessary to simulate the hydraulic systems of a helicopter or other carrier, and notably the brake pedals, with solutions without hydraulics which must however be perfectly representative of the real behavior. Also, there is the need for simulation solutions such that the point of view of the pilot in the simulator is identical to the real carrier. Such a solution must be compact, of low bulk, installed discreetly in the region of the pedals, easy to install, to adjust, and to maintain.

The solution must allow a rapid response, and have excellent repeatability, without drift. Finally, it is necessary to use solutions that are inexpensive to purchase and operate so as to be competitive on the simulation market.

The present invention proposes addressing the abovementioned needs.

SUMMARY OF THE INVENTION

One object of the present invention is to propose a device which makes it possible to simulate foot braking on the rudder bar pedals.

Advantageously, the device of the invention is wholly without hydraulics and is composed of mechanical equipment associated with electrical equipment.

Advantageously, the mechanical part and the electrical part are implemented by simulation software in a combined way, and according to the situation of the carrier which is simulated, whether it be in flight or standing on the ground.

Advantageously, the device of the invention makes it possible to provide the pilots with sensations representative of all the situations described in the flight manual, and particularly the situations that include the pressurization of the hydraulic braking circuit which results in an increase of effort that the pilot applies with his or her foot, and a reduction of the range of travel of the pedal.

The invention will be advantageously applicable in the field of flight simulators, and in particular for the simulators of carriers having wheel brakes which are not electrical, such as helicopters.

To this end, the subject of the invention is a foot-braking simulation device comprising:
  a mechanical braking module configured for supplying a linear effort value in response to a press on a brake pedal;
  an electromagnetic friction module configured for supplying a friction force value in response to said press on the brake pedal;
  a software calculation module configured for combining the values obtained from the mechanical braking and electromagnetic friction modules to calculate a control value, and generate variable force feedback on said brake pedal as a function of the control value.

According to embodiments:
  the mechanical braking module comprises a spring configured for supplying a linear effort value that is proportional to the stiffness of the spring;

the mechanical braking module comprises a set of springs generating several stiffnesses at different points of the travel of the brake pedal;

the electromagnetic friction module comprises a powder brake configured for supplying a friction force value upon the rotation of the motor of the powder brake;

the electromagnetic powder brake receives variable electric current;

the mechanical braking module comprises a first sensor configured for supplying a value representative of the position of the pedal, and a second sensor configured for supplying a value representative of the effort applied on the pedal.

The invention also covers a rudder bar equipped with two pedals, each pedal comprising a device as claimed.

The invention also covers a helicopter simulator having at least one rudder bar equipped with two pedals, each pedal comprising a device as claimed.

More generally, the invention covers an aircraft simulator comprising at least one device as claimed.

Another subject of the invention is a foot-braking simulation method, comprising the following steps:

detecting a press on a brake pedal;

generating a value relative to a linear effort produced in response to said press on the brake pedal;

generating a value relative to an electromagnetic friction force produced in response to said press on the brake pedal;

calculating a control value from the linear effort and electromagnetic friction values; and generating variable force feedback on said brake pedal according to the control value.

According to Embodiments:

the step of generating a value relative to a linear effort consists in generating said value from data deriving from a mechanical braking module coupled to the brake pedal;

the step of generating a value relative to an electromagnetic friction force consists in generating said value from data deriving from an electromagnetic friction module coupled to the brake pedal and to the mechanical braking module;

the step of calculating a control value consists in determining an additional effort value to be supplied by the electromagnetic brake by deducting the value of the linear effort of the spring from the total effort demanded in order to determine the electricity value to be supplied to the electromagnetic brake.

The invention in another aspect covers a computer program product comprising code instructions making it possible to perform the steps of the braking simulation method as claimed when said program is run on a computer. It also covers an aircraft simulation computer program product comprising a braking simulation computer program product as claimed.

BRIEF DESCRIPTION OF THE DRAWINGS

Different aspects and advantages of the invention will become apparent from the description of a preferred but nonlimiting implementation of the invention, with reference to the figures below.

DETAILED DESCRIPTION

Generally, the invention proposes a braking device for a simulator which combines the rendering of two types of efforts, efforts originating from a mechanical arrangement and efforts originating from an electrical arrangement. In a preferential implementation, the "mechanical" efforts are rendered by springs and the "electrical" efforts are rendered by an electromagnetic powder brake. This mechanical/electrical combination makes it possible to render the dynamic behavior of the brake system of a real carrier in all situations accurately. The mechanical part of the device is designed to observe the kinematics of the rudder bar in all the setting configurations, while limiting the impact of the mechanism in terms of weight and dynamics on the pedal.

Figure 1A:
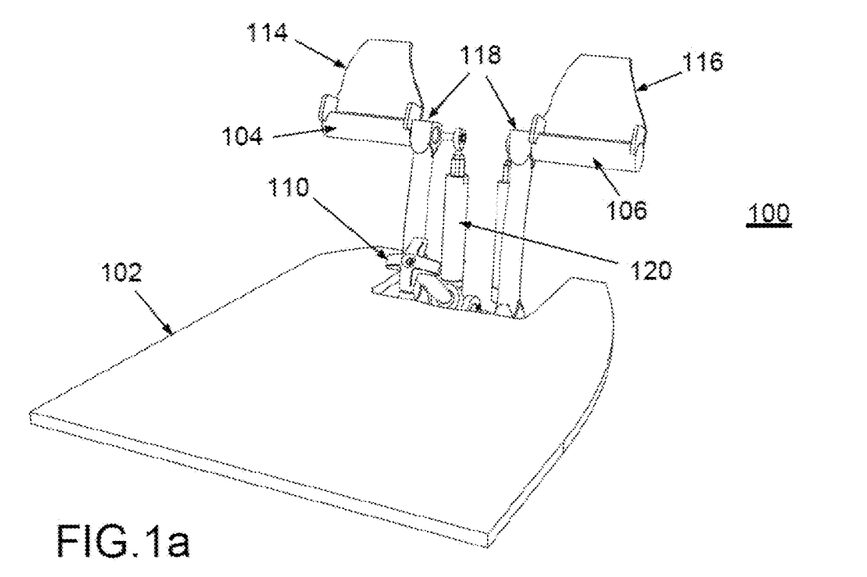
FIGS. 1a and 1b respectively show a front view of a real rudder bar and of a simulation rudder bar equipped with the braking device of the invention in an embodiment.
Figure 1B:
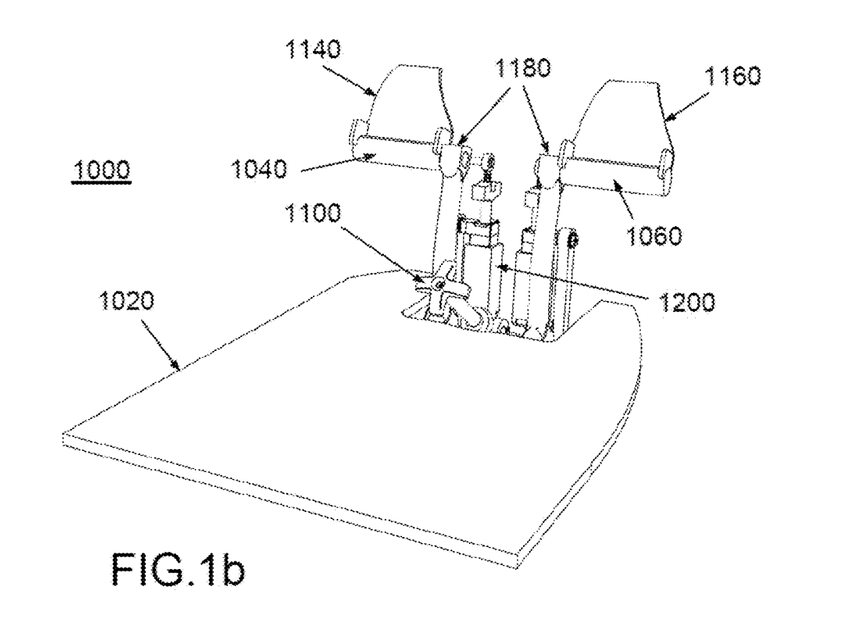
Figure 2A:
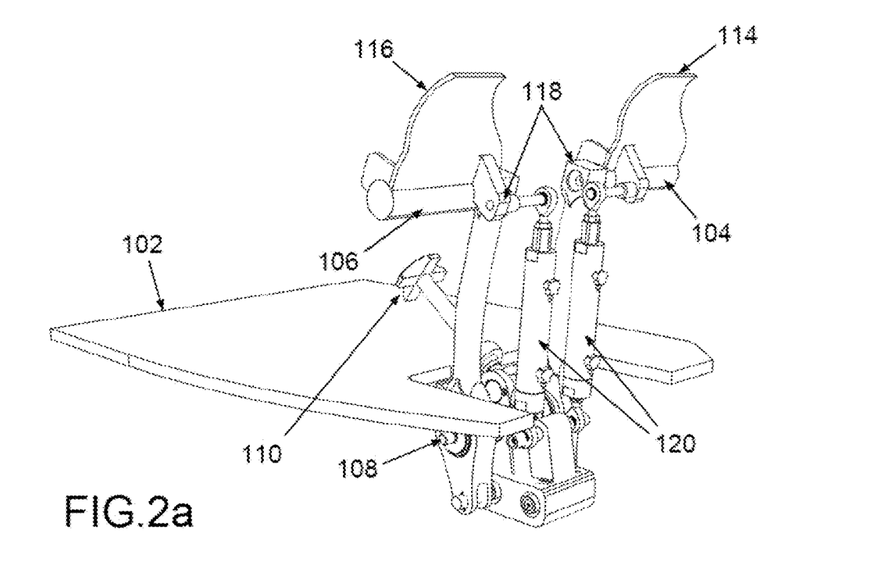
FIGS. 2a and 2b respectively show a rear view of a real rudder bar and of a simulation rudder bar equipped with the braking device of the invention in an embodiment.
Figure 2B:
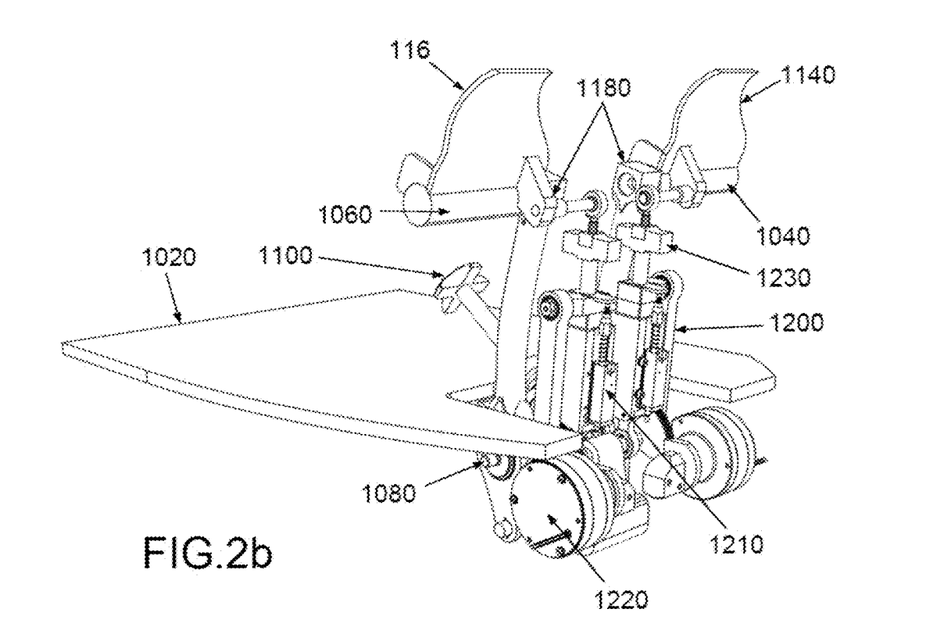

FIGS. 1a and 1b respectively show a front view of a real rudder bar and of a simulation rudder bar equipped with the braking device of the invention, and FIGS. 2a and 2b respectively show a rear view of a real rudder bar and of a simulation rudder bar equipped with the braking device of the invention. In the interests of clarity, the same elements bear the same references in the different figures.

In aeronautics, the rudder bar (100) is one of the main flight control situated in the cockpit of a carrier (airplane or helicopter). It is generally fixed to a floor structure (102), and comprises two pedals (104, 106), one for each foot, allowing the pilot to actuate the rudder of an airplane, of a glider, or the antitorque rotor of a helicopter. That makes it possible to control the craft on the yaw axis, the movements on the pitch and roll axes being ensured by means of the control column (not illustrated).

These yaw pedals have a point of rotation (108) and are mechanically combined such that, when the pilot presses and moves, for example, the left pedal forward to control yaw, the right pedal is displaced backward.

The rudder bar structure also comprises a front-to-rear setting system actuated by a setting thumbwheel (110) to be adjusted to the size of the pilots. The use of this function influences the kinematics of the rudder bar, and varies in particular the pedal inclinations, which increases the complexity of the possible simulation cases and increases the importance of the observance, by the simulated rudder bar, of the geometry of the real rudder bar. In simulation, the setting of the rudder bar is defined before the start of the exercise and does not change during training.

In dual-control cockpits, each pilot has two yaw pedals (104, 106), each pedal making it possible to control the helicopter yaw control. The two sets of pedals can be mounted on one and the same frame or on two separate frames, but the pilot and copilot rudder bars are joined, and are displaced together.

In a helicopter equipped with wheels, as represented in FIGS. 1a-1b and 2a-2b, each of the yaw pedals (104, 106 in FIGS. 1a-2a) and (1040, 1060 in FIGS. 1b-2b) is equipped at its top end with a brake pedal (114, 116 in FIGS. 1a-2a) and (1140, 1160 in FIGS. 1b-2b). A brake pedal (of the real or simulation rudder bar) is activated by the pilot (or copilot) by pressing the foot on the top of the yaw pedal about an axis of rotation (118, 1180). The brake pedals are not combined, and are mechanically independent.

On a real rudder bar (FIGS. 1*a* and 2*a*), the press on a brake pedal causes the pressurization of the hydraulic circuit of the braking system (120). On the simulation rudder bar (FIGS. 1*b* and 2*b*), the press on a brake pedal activates the device of the invention (1200) which makes it possible to simulate the braking system, and in particular simulate the hydraulic pumping.

Each brake pedal of the simulation rudder bar is equipped with the device of the invention (1200) which, by combining a mechanical action and an electrical action, makes it possible to supply a variable force feedback. The force feedback principle consists in recovering data supplied by the system and the user, transmitting them to a computation platform, which generates a feedback force corresponding to that which would be felt in actual operation. The variability makes it possible to adjust the effort in real time for it to correspond to all the situations encountered by a pilot in flight, taxiing or parking phases, for normal, degraded and failure operating cases. The system and the user are thus linked by a stream of computer data converted in mechanical movement both on the user and on the system.

In a preferential embodiment, the device of the invention consists in having, for each of the pedals of the simulated cockpit, the parallel installation of a mechanical braking module (1210) and of an electromagnetic friction module (1220). The simulation system further comprises, conventionally, sensors (1215, 1230), connecting rods and links (represented in FIG. 3), in order to preserve the kinematics and the settings of the real rudder bar. Advantageously, all the ball joints and pivots are links without play and with very low friction.

In a helicopter simulator with dual rudder bar, a device of the invention is installed on each of the four brake pedals of the simulated helicopter because they can be actuated independently.

Also associated with the device is simulation software running on a computer (1500) which receives, by wire or wirelessly, the information from the various sensors, in order to calculate a control to adapt the pressure to be applied to the braking system. The simulation software comprises a module which makes it possible to define an effort rendering law which is to be applied during the simulation operation and which is a function of the current simulation scenario. Advantageously, contrary to the known systems, the system of the invention makes it possible to render an effort law (Fc) which is variable in real time. Indeed, beyond the certification demands which limit the representativeness to a single braking case, the system of the invention makes it possible to render all the effort laws that a pilot may encounter on a real helicopter.

Figure 5:
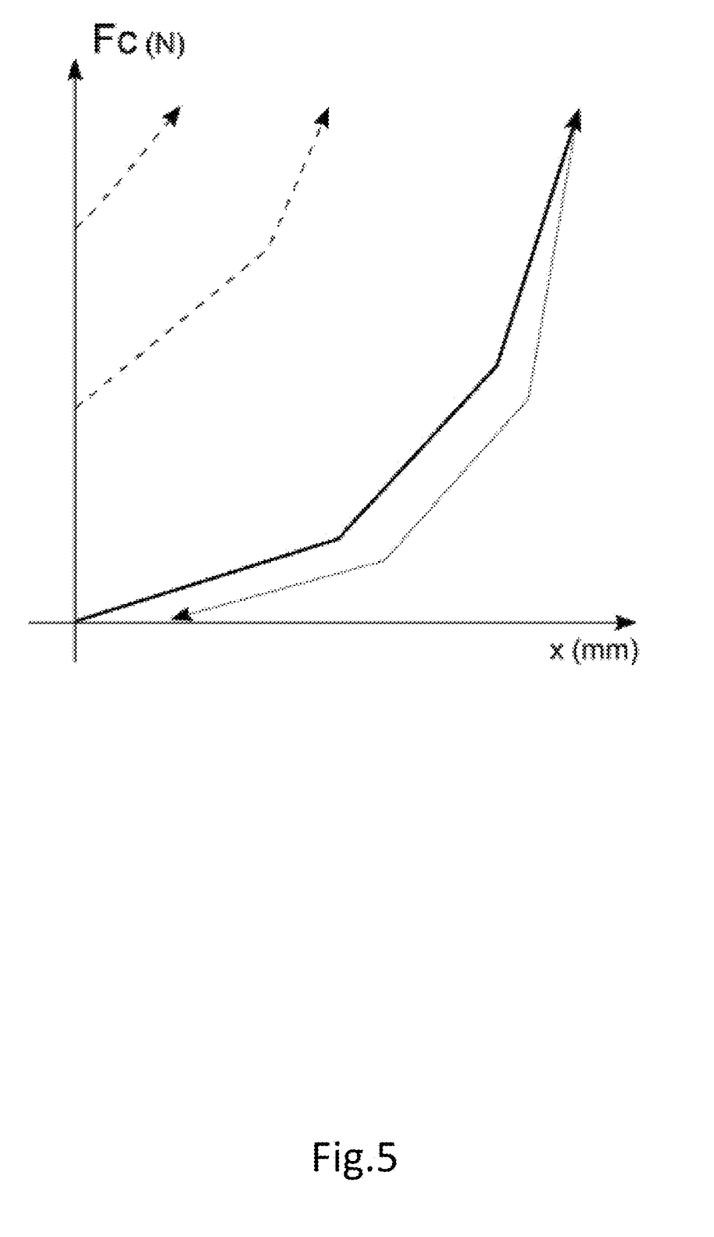
FIG. 5 illustrates different effort laws on an exemplary helicopter pedal.

FIG. 5 illustrates different effort laws on an exemplary AW139 helicopter pedal. The press effort on the pedal on the y axis is expressed in Newtons (N) and the x axis corresponds to the displacement x of the pedal in millimeters (mm).

The bold line curve describes the effort law when the pilot presses on a pedal while the helicopter is taxiing a runway. This curve is subject to certification and is compared to that of the real helicopter. It can be linear or more complex. Contrary to the device of the invention, the conventional, purely spring-based rendering systems do not make it possible to render a curve comprising more than two stiffness slopes and are not therefore theoretically certifiable if applicable.

The bottom pedal feedback curve exhibits a hysteresis. Contrary to the device of the invention, the conventional, purely spring-based rendering systems do not make it possible to render this phenomenon. However, it is perceptible to the pilots and it contributes to the immersiveness of the simulator.

The top dotted line curves apply when the pressurization of the hydraulic braking circuit is simulated according to the method of the invention, by successive presses on the pedal. These curves are plotted dynamically as a function of the pressure exerted on the pedal. Contrary to the device of the invention, the conventional, purely spring-based rendering systems do not make it possible to render this phenomenon, even though it is described in the procedures of the flight manual and must therefore in principle be subject to certification.

Figure 3:
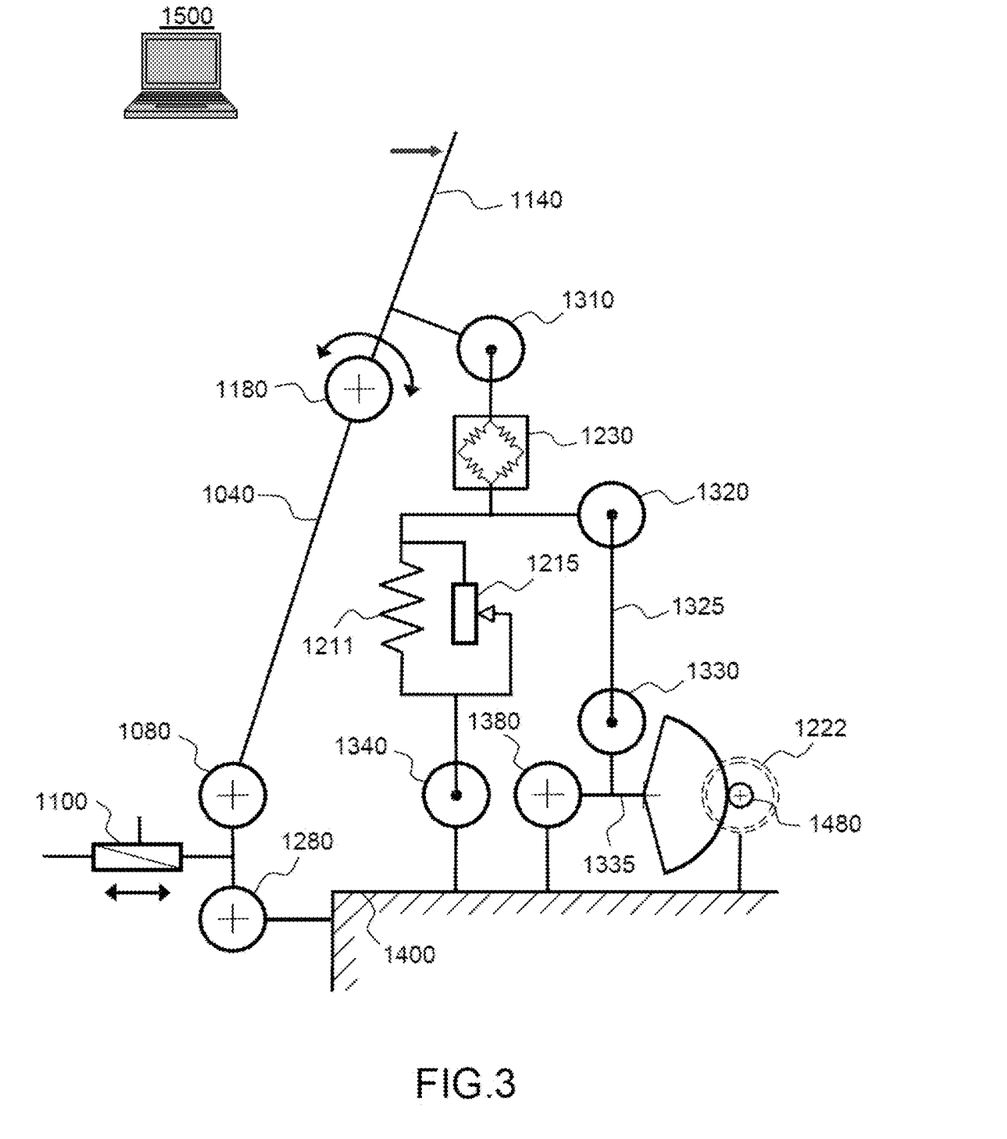
FIG. 3 is kinematic representation of the device of the invention in an embodiment.

FIG. 3 is a schematic representation of the kinematics of the device of the invention in one embodiment. In the interests of clarity, all the elements that make up the pivot links guiding a part in rotation while allowing only a rotation about the axis of a link are represented by a circle containing a cross (1080, 1180, 1280, 1380, 1480), and all the elements that constitute ball joint links fully linking two parts in translation but allowing them rotational freedom are represented by a circle containing a dot (1310, 1320, 1330, 1340). Thus, for example, the yaw pedal (1040) is articulated at its bottom end by a pivot link (1080), the brake pedal (1140) is articulated by a pivot link (1180) and is coupled to an effort sensor (1230) by a brake/sensor ball joint link (1310).

The device of the invention comprises a mechanical braking module (1210) coupled to an electromagnetic friction module (1220). The mechanical braking module (1210) supplies a linear effort management in response to a press on the brake pedal. In a preferential implementation, the mechanical braking module comprises a spring (1211) and the measurement of the linear effort produced is a value proportional to the stiffness of the spring. In a variant implementation, the mechanical module comprises a set of springs or elastic washers. Several springs can be involved when the brake pedal is pressed, generating several stiffnesses at different points of the travel of the pedal. The measurement of the effort produced is then a value which takes account of the different stiffnesses.

The mechanical braking module further comprises a first sensor (1215) which makes it possible to recover a value representative of the travel of the pedal, and a second sensor (1230) which makes it possible to recover the effort applied by the foot of the pilot on the pedal.

It should be noted that the known solutions which use only this purely mechanical braking simulation setup require a given position of the pedal to have a corresponding given effort on the pedal. These solutions do not then make it possible to dynamically vary the effort on the pedal, contrary to the device of the invention.

Thus, advantageously, the device of the invention further comprises an electromagnetic friction module (1220) coupled to the mechanical braking module.

In a preferential implementation, the electromagnetic friction module comprises an electromagnetic powder brake (1222).

The person skilled in the art knows the principle of a magnetic powder brake which, generally, comprises two mutually independent rotors. The outer rotor contains a toroidal coil electrically powered by direct current. Between the rotors, there is a magnetized powder. By electrification of the coil, through the magnetization, the grains of the powder assume the form of a chain. The stiffness of this chain varies with its magnetic field and is directly proportional to the electricity supplied. In this way, a strong grip of the brake between the two rotors results, which links up a transmission torque proportional to the electricity supplied.

Preferentially, the electromagnetic powder brake is in a fixed position on the floor structure in order for it not to effect the inertia and the dynamics of the rudder bar. The electromagnetic powder brake (1222) is coupled to a reduction gear (1335) that pivots about an axis of rotation (1380). The reduction gear (1335) is coupled to a connecting rod (1325) via a reduction gear/connecting rod ball joint link (1330). The connecting rod (1325) is coupled to the mechanical braking module (1210) (spring and effort and position sensors) via a connecting rod/sensor ball joint link (1320).

Figure 4:
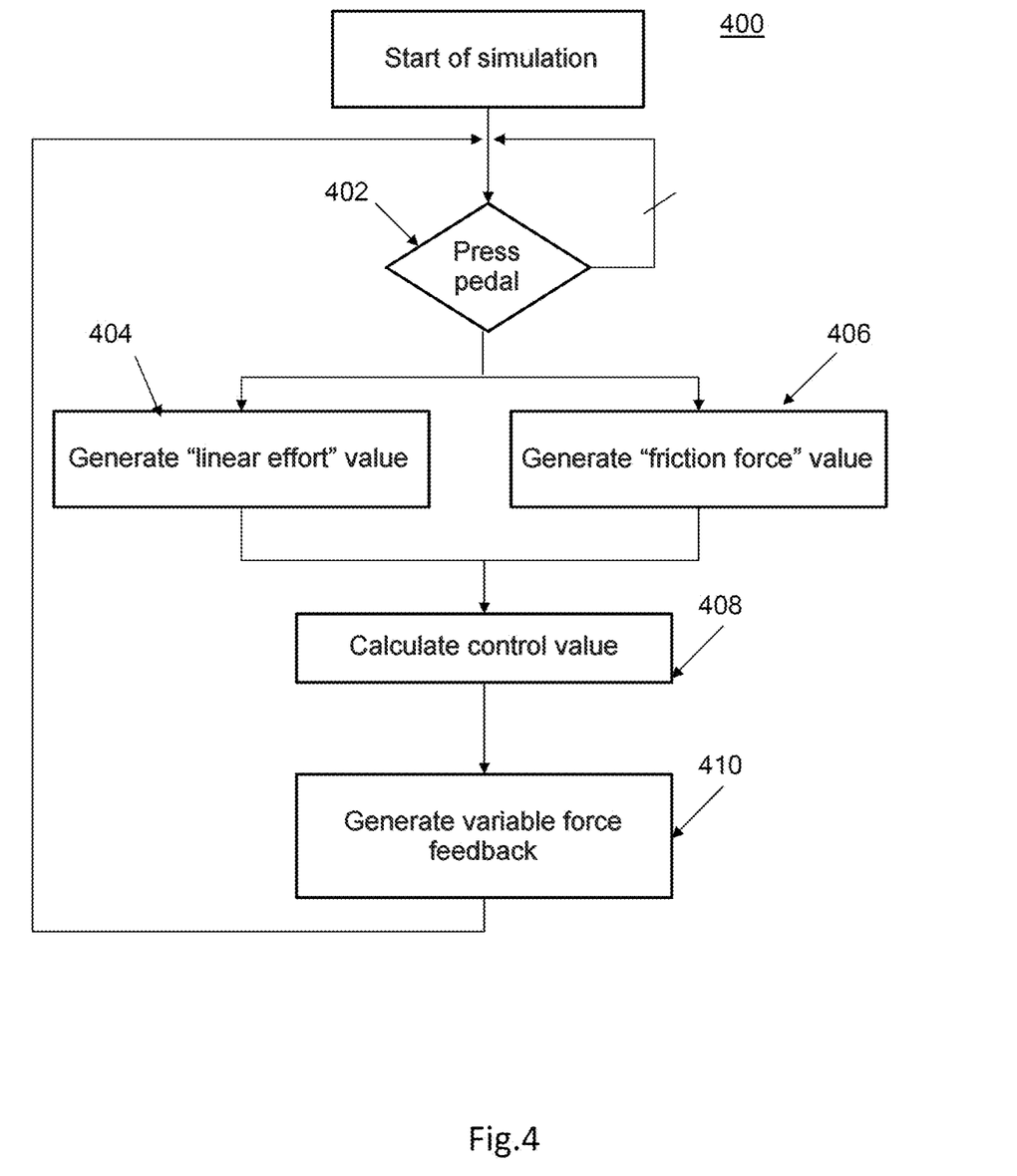
FIG. 4 illustrates the steps of implementation of the device of the invention in an embodiment.

In the simulation operation (400), as represented by FIG. 4, when the pilot presses on the brake pedal (402), the spring (1211) of the mechanical braking module is compressed. The linear sensor (1215) supplies a linear effort measurement which is proportional to the stiffness of the spring and to the press travel. The effort sensor (1230) can supply measurements representative of the effort which is applied by the pilot on the pedal. The press on the brake pedal is characterized by the acquisition of the measurements of the linear sensor and of the effort sensor. The press on the brake pedal at the same time causes the connecting rod (1325) of the electromagnetic friction module to displace the reduction gear/connecting rod ball joint link (1330), causing the reduction gear (1335) to pivot. This leads to a rotation of the axis of the electromagnetic powder brake, which causes the electromagnetic powder brake (1222) to rotate. The rotation of the brake generates a friction. The resisting torque of the powder brake (which is proportional to the electricity supplied), induces a resisting effort which is fed back to the brake pedal and is added to the linear effort of the spring.

The linear effort which is produced (404) by the mechanical braking module and the friction force which is provoked (406) by the electromagnetic friction module are transmitted to the computation module where they are combined in order to generate a variable force feedback value (410).

The computation module makes it possible to calculate a control value (408) from the information obtained from the two mechanical and electromagnetic friction braking modules, and adapt the pressure to be set in the braking system in order to produce a dynamic effort on the brake pedal, as a function of the effort rendering law which has been defined for the simulation scenario.

Moreover, in the context of certification, the method makes it possible to render, by mathematical transform, the effort and displacement values at the point of press on the pedal, in order to be able to compare them to data measured on a real helicopter.

The effort (Fvariable) that the powder brake must apply, or control value, is obtained by subtracting the effort (Fr=k·x) of the spring of stiffness 'k', from the setpoint effort law (Fc) defined for the current scenario. From this value (Fvariable), the electrical current to be supplied to the powder brake is deduced. Preferentially, the control is filtered by an integral function, to avoid, when the brake effort increases, the subtraction (Fc−Fr) going to zero.

The friction generated by the powder brake can thus be adjusted dynamically as a function of the electric current which supplies the electromagnetic powder brake. Indeed, the stiffness of the chain formed by the powder grains varies with its magnetic field and is directly proportional to the electricity supplied. When the pilot no longer presses on the brake pedal, the electric current supplying the electromagnetic powder brake is cancelled. When the electric current is zero, the friction of the powder brake is very low, and the spring (1211) returns the brake pedal (1140) to its initial position of rest.

Moreover, in order to increase the rotation of the powder brake, it is possible to apply a reduction ratio.

The solution described ensures conformity to all the requirements, in terms of space, of functionalities, of performance, of technological choices and of costs. In an industrial application, this solution meets the simulation requirements for the brakes of the AugustaWestland helicopter AW139 for a "level D" qualification according to the European and American standards.

The present description illustrates a preferential embodiment of the invention, but it is nonlimiting. An example has been chosen to allow a good understanding of the principles of the invention, and a concrete application, but is not exhaustive and the description allows the person skilled in the art to add modifications for other implementations variants. Thus, for example, it is possible to add to the device described as a gear system to create a reduction ratio and increase the rotation of the electromagnetic powder brake while keeping the same principles. The device in its variants will also be applicable to vehicle simulators to simulate braking.

The invention claimed is:

1. A device for simulating a dynamical force feedback of a hydraulic braking system of an aeronautical vehicle, the device comprising:
   a rudder bar including a non-hydraulic braking system and a brake pedal connected to a top end of a yaw pedal, wherein the yaw pedal is articulated by a first pivot link and the brake pedal is articulated by a second pivot link, and wherein a press on the brake pedal simulates, via the non-hydraulic braking system, a pressurization of a hydraulic circuit of the hydraulic braking system; and
   wherein the non-hydraulic braking system includes:
      a mechanical braking module comprising a first sensor configured for supplying a value representative of a position of the brake pedal, and a second sensor configured for supplying a value representative of an effort applied on the brake pedal, wherein the brake pedal is coupled to the second sensor by a first ball joint link, the mechanical braking module coupled to the rudder bar and configured for supplying, in response to detecting a press on the top end of the yaw pedal, a linear effort value representative of the travel of the top end of the yaw pedal and of the effort applied on the top end of said yaw pedal;
      an electromagnetic friction module coupled to the mechanical braking module and comprising a powder brake fixed to a floor structure, the powder brake coupled to a reduction gear configured to pivot about an axis of rotation, the reduction gear further coupled to a connecting rod via a second ball joint link, and the connecting rod coupled to the first and second sensors via a third ball joint link, the electromagnetic friction module being configured for allowing rotation of the powder brake upon detection of said press on the top end of said yaw pedal, the rotation of the powder brake generating a friction force value; and
      a software calculation module configured for receiving and combining the linear effort value and the friction values to calculate a control value, the control value being representative of a pressure to be set in the non-hydraulic braking system to produce a dynamic effort on said yaw pedal, thereby generating a variable force feedback on the brake pedal in the non-hydraulic braking system corresponding to that which would be felt on the brake pedal in the hydraulic braking system.

2. The device as claimed in claim 1, wherein the mechanical braking module comprises a spring configured for supplying a linear effort value that is proportional to a stiffness of the spring.

3. The device as claimed in claim 1, wherein the mechanical braking module comprises a set of springs generating several stiffnesses at different points of travel of the brake pedal.

4. The device as claimed in claim 1, wherein the powder brake receives a variable electric current.

5. The device as claimed in claim 1, wherein the mechanical braking module comprises a first sensor configured for supplying a value representative of a position of the brake pedal, and a second sensor configured for supplying a value representative of an effort applied on the brake pedal.

6. A helicopter simulator having at least one rudder comprising a device as claimed in claim 1.

7. An aircraft simulator comprising at least one device as in claim 1.

8. A braking simulation method implemented by computer, for simulating, in a non-hydraulic braking system, a dynamical force feedback of a hydraulic braking system of an aeronautical vehicle, the braking simulation method comprising:
providing the non-hydraulic braking system, including a mechanical braking module and an electromagnetic friction module, the mechanical braking module comprising a first sensor configured for supplying a value representative of a position of a brake pedal, and a second sensor configured for supplying a value representative of an effort applied on the brake pedal, wherein the brake pedal is coupled to the second sensor by a first ball joint link, the mechanical braking module coupled to a rudder bar, and the electromagnetic friction module coupled to the mechanical braking module and comprising a powder brake fixed to a floor structure, the powder brake coupled to a reduction gear configured to pivot about an axis of rotation, the reduction gear further coupled to a connecting rod via a second ball joint link, and the connecting rod coupled to the first and second sensors via a third ball joint link;
detecting a press on the brake pedal connected to a top end of a yaw pedal of the rudder bar of the non-hydraulic braking system, where the yaw pedal is articulated by a first pivot link and the brake pedal is articulated by a second pivot link;
generating, in response to said press on the brake pedal connected to the top end of the yaw pedal, a linear effort value representative of the travel of the brake pedal connected to the top end of the yaw pedal and of the effort applied on the brake pedal connected to the top end of said yaw pedal;
allowing rotation of a powder brake of an electromagnetic module, upon detection of said press on the brake pedal connected to the top end of said yaw pedal, wherein the rotation of the powder brake generates a friction force value;
calculating a control value from the combination of the linear effort value and the friction force values, the control value being representative of a pressure to be set in the non-hydraulic braking system to produce a dynamic effort on the brake pedal connected to said yaw pedal; and
generating a variable force feedback on the brake pedal connected to said yaw pedal according to the control value, the variable force feedback on the brake pedal in the non-hydraulic braking system corresponding to that which would be felt on the brake pedal in the hydraulic braking system.

9. The method as claimed in claim 8, wherein generating a value relative to a linear effort consists in generating said value from data deriving from a mechanical braking module coupled to the yaw pedal.

10. The method as claimed in claim 8, wherein generating a friction force value relative to the friction force consists in generating said value from data deriving from an electromagnetic friction module coupled to the yaw pedal and to a mechanical braking module.

11. The method as claimed in claim 8, wherein the step of calculating a control value consists in determining an electric current value to be supplied to the powder brake.

12. A computer program product comprising code instructions for performing the steps of the braking simulation method as claimed in claim 8, when said computer program product is run on a computer.

13. An aircraft simulation computer program product comprising the computer program product as claimed in claim 12.

* * * * *